(12) United States Patent
Tsubata et al.

(10) Patent No.: US 7,310,124 B2
(45) Date of Patent: Dec. 18, 2007

(54) COLOR FILTER SUBSTRATE, METHOD OF MANUFACTURING THE COLOR FILTER AND DISPLAY DEVICE

(75) Inventors: Toshihide Tsubata, Matsusaka (JP); Tsuyoshi Tokuda, Matsusaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 159 days.

(21) Appl. No.: 10/840,886

(22) Filed: May 8, 2004

(65) Prior Publication Data
US 2004/0223095 A1    Nov. 11, 2004

(30) Foreign Application Priority Data
May 9, 2003   (JP)   .............. 2003-131853

(51) Int. Cl.
*G02F 1/1333*   (2006.01)
(52) U.S. Cl. .............. 349/110; 349/106; 349/138
(58) Field of Classification Search ........ 349/110–111, 349/153, 129, 106
See application file for complete search history.

(56) References Cited
U.S. PATENT DOCUMENTS 5,530,568 A * 6/1996 Yamamoto et al. ......... 349/143
5,739,880 A * 4/1998 Suzuki et al. ............... 349/110
6,127,072 A * 10/2000 Shiba et al. .................... 430/7
6,514,645 B2   2/2003 Chen

FOREIGN PATENT DOCUMENTS

| JP | 07-120613 | 5/1995 |
| JP | 08-248409 | 9/1996 |
| JP | 09-258208 | 10/1997 |

OTHER PUBLICATIONS

Official Communication issued in corresponding Chinese Application No. 200410034734.8, dated Feb. 24, 2006.

* cited by examiner

*Primary Examiner*—Andrew Schechter
*Assistant Examiner*—Phu Vu
(74) *Attorney, Agent, or Firm*—Keating & Bennett, LLP

(57) ABSTRACT

A display device includes a color filter substrate having a flat upper surface. The color filter substrate of the display device includes a transparent substrate, a color filter layer provided on the transparent substrate and having a plurality of color filters arranged so that gaps are formed between the color filters, a light shielding layer having a plurality of light shielding portions disposed in the gaps between the plurality of color filters, and a light-transmitting resin layer having a plurality of light-transmitting resin portions respectively disposed on the plurality of first light shielding portions on the substrate side of the same. The upper surfaces of the plurality of first light shielding portions and the plurality of color filters form a substantially flat surface.

27 Claims, 8 Drawing Sheets

BACK EXPOSURE

DEVELOPMENT

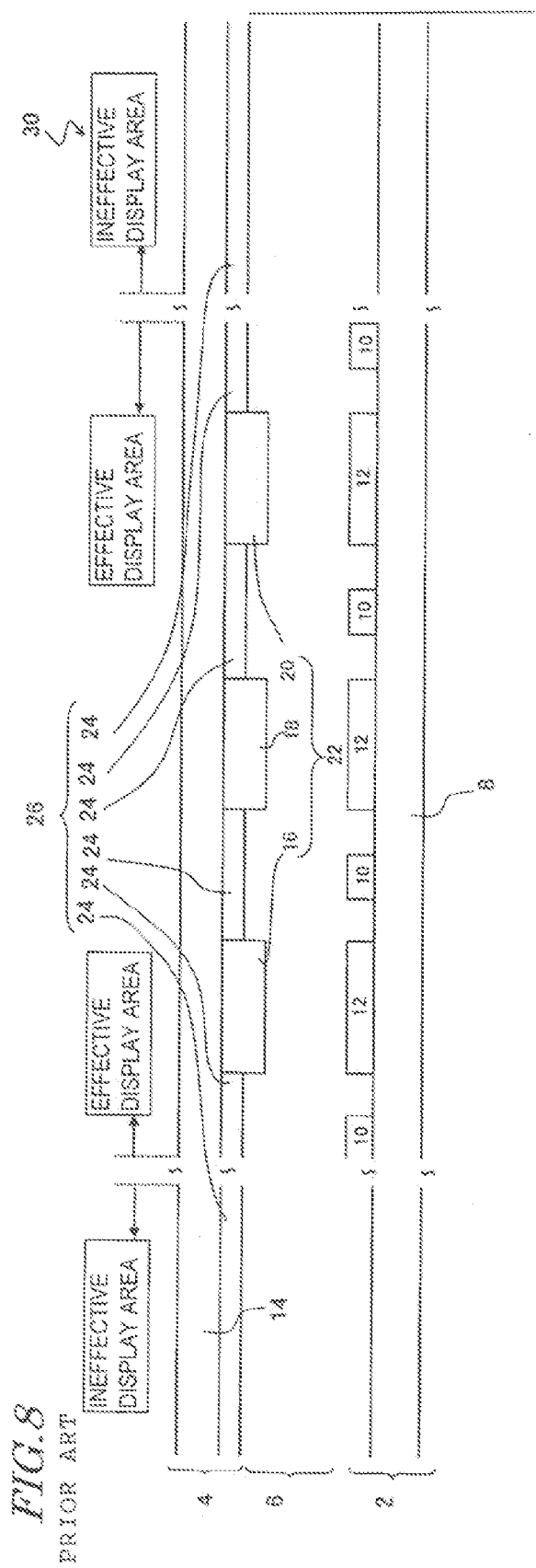

COLOR FILTER SUBSTRATE, METHOD OF MANUFACTURING THE COLOR FILTER AND DISPLAY DEVICE

BACKGROUND OF THE INVENTION

1. Field of the Invention

The present invention relates to a color filter substrate used in display devices such as liquid crystal displays, electroluminescent (EL) displays and plasma displays, and to a method of manufacturing the color filter substrate.

2. Description of the Related Art

Liquid display devices are being widely used in various electronic appliances because of their features: a small size, a small thickness, a low power consumption, and a light weight. In particular, active-matrix liquid crystal display devices having switching elements are being widely used for office automation machines such as personal computers, audio-visual appliances such as television sets, portable telephones, etc. In recent years, rapid progress has been made in improving the qualities of liquid display devices, e.g., increasing the size, improving the definition, increasing the effective pixel area ratio (aperture ratio) and improving the color purity.

The structure of an ordinary active-matrix liquid crystal display device will be described with reference to FIG. 8. FIG. 8 is a cross-sectional view of a liquid crystal display device.

As shown in FIG. 8, the liquid crystal display device 30 has an active matrix substrate 2 and a color filter substrate 4 opposed to each other, and a liquid crystal layer 6 disposed between these substrates. The liquid crystal display device 30 also has, in a substrate surface, a display region (effective display area) and a picture-frame region (non-display area) surrounding the display region.

The active-matrix substrate 2 is constituted by a transparent insulating substrate 8 made of glass for example, a gate bus line (not shown) for a scanning signal formed on the substrate 8, source bus lines 10 for a data signal, active elements (not shown) such as thin-film transistors (TFT) and transparent pixel electrodes 12. The gate bus lines, the source bus lines 10, the active elements and the pixel electrodes 12 are formed on the substrate 8. A plurality of the pixel electrodes 12 are arrayed in matrix form in the display region.

The color filter substrate 4 is constituted by a transparent insulating substrate 14 made of glass, for example, a color filter layer 22 including a red color filter 16, a green color filter 18 and a blue color filter 20, a light shielding layer 26 including a plurality of light shielding portions 24, and a counter electrode (not shown). The color filter layer 22, the light shielding layer 26 and the counter electrode are formed on the substrate 14. The red color filter 16, the green color filter 18 and the blue color filter 20 are provided in correspondence with the plurality of transparent pixel electrodes 12 provided on the active-matrix substrate 2 side. The light shielding portions 24 are disposed in gaps between the color filters and in the picture-frame region. Ordinarily, the counter electrode is provided on the surfaces of the light shielding layer 26 and the color filter layer 22 on the liquid crystal layer 6 side.

An example of a method of manufacturing the conventional color filter substrate 4 will be described.

In recent years, a dry film method has been used as a color filter substrate manufacturing method. The dry film method has the advantages of ensuring higher yield of materials and reducing the manufacturing cost in comparison with the spin costing method conventionally used. The dry film method also has the advantage of enabling the formation of a layer that is more uniform in thickness.

A method of manufacturing the conventional color filter substrate by using the dry film method will be described below with reference to FIGS. 9A to 9F.

A dry film is formed in such a manner that a photosensitive resin film is interposed between film supporting members such as polyethylene terephthalate (PET) films facing its two major surfaces. Four dry films in which red, blue, green and black pigments are respectively dispersed in photosensitive resin films are used. Typically, the photosensitive resin film is of a negative type.

First, the red dry film, for example, is adhered to the glass substrate 14 by being pressed against the same and the film supporting member is thereafter separated, thus transferring a red photosensitive resin film 16R onto the substrate 14, as shown in FIG. 9A. Ordinarily, this step is a thermal transfer step executed by heating the dry film. Subsequently, the transferred red photosensitive resin film 16R is exposed with a mask 32 disposed thereon and undergoes development. The red color filter 16 is thereby formed as shown in FIG. 9B.

Subsequently, the same step as that described above is performed by using, for example, the green dry film to form the green color filter 18 as shown in FIG. 9C. Further, the same step as that described above is performed by using the blue dry film to form the blue color filter 20 as shown in FIG. 9D. Thereby, the color filter layer 22 including red, green and blue color filters 16, 18 and 20 is formed.

After the formation of the color filter layer 22, the same method as that used for forming the color filter layer 22 is performed, that is, the black dry film is adhered to the glass substrate 14 by being pressed against the same to transfer a black photosensitive resin film 26R onto the substrate 14 as shown in FIG. 9E. Exposure (back exposure) is performed on the glass substrate 14 from the back surface side of the same. By this back exposure, the black photosensitive resin film 26R is exposed (in a self alignment manner, which means no use or alignment of separate masks is necessary) with the red, green and blue color filters 16, 18, and 20 being used as a mask. After exposure, development is performed to form the light shielding layer 26 having light shielding portions 24 disposed in the gaps between adjacent color filter portions and in the picture-frame region.

The manufacturing of the color filter substrate is thus completed.

In the above-described manufacturing method, since the light shielding layer 26 is formed in a self-alignment manner with the color filters each used as a mask (as shown in FIGS. 9E and 9F), no gap is formed between the color filters and the light shielding portions. Therefore, the above-described manufacturing method has the advantage of improving the yield. However, since the photosensitive resin film 26R of a negative type is used for the light shielding layer 26, the amount of exposure at the time of back exposure is limited to avoid setting of the black photosensitive resin film 26R formed on the color filters 16, 18, and 20. Therefore, the film thickness of the light shielding portions 24 is much less than the thickness of the color filters 16, 18, and 20, and a difference in level (indicated by X in FIG. 9F) occurs between the light shielding portions 24 and the color filters 16, 18, and 20.

In particular, if the film thickness of the color filters 16, 18, and 20 is increased in order to improve the display color purity in the case of making the color filter substrate by the above-described manufacturing method, the difference in level between the color filters 16, 18, and 20 and the light shielding portions 24 due to the film thickness difference between the color filters 16, 18, and 20 and the light shielding portions 24 is considerably large. If a difference in level exists in the surface of the substrate on the liquid crystal layer side, the alignment of liquid crystal molecules is disturbed by the difference in level which causes serious degradation in display quality.

The problem that a difference in level occurs between the color filters and the light shielding portions (that is, the upper surface of the color filter layer cannot be made flat) is not limited to the dry film method. The same problem also occurs in the case of use of a spin coating method and a slit coating method (a method of performing film forming by ejecting a film forming material through a rectangular slit and by moving the slit relative to the substrate while maintaining a predetermined gap between the slit and the substrate surface, which is sometimes called a slot coating method or a dye coating method) and other film forming methods. Various attempts have been made to solve these problems.

For example, Japanese Laid-Open Patent Publication No. 7-120613 discloses a method of reducing the difference in level between color filters and light shielding portions by performing a development step two times. More specifically, in this method, a light shielding film (black photosensitive resin film) is formed so as to cover a color filter layer and is exposed through a photomask from the upper surface side of the substrate and development is performed to form light shielding portions. When the light shielding portions are formed, internal portions of the light shielding portions are not substantially set. Also, due to an alignment margin (misalignment), the light shielding portions are formed so as to overlap end portions of the color filters. Subsequently, the shielding portions are set on the substrate side by performing back exposure. Thereafter, the second exposure is performed to remove portions (projections) formed on the color filters in the light shielding portions. According to the description of this method, the projections are removed by the second development step to flatten the upper surface of the color filter layer. In the method described in Japanese Laid-Open Patent Publication No. 7-120613, a dry film method is used to form the light shielding layer.

Japanese Laid-Open Patent Publication No. 8-248409 discloses a method of flattening the upper surface of a color filter layer in such a manner that a base layer having a flat surface is formed on a substrate by combining light shielding portions and transparent resin portions, and the color filter layer is formed on the base layer. The transparent resin portions must transmit visible light in this method. More specifically, in this manufacturing method, light shielding portions are formed in correspondence with the peripheries of pixels, transparent resin portions having the same thickness as that of the light shielding portions are thereafter formed on regions where the light shielding portions are not formed. A base layer formed of the light shielding portions and the transparent resin portions is formed on the substrate. A color filter layer is formed on this base layer. According to the description of this method, the upper surface of the color filter layer is flattened since the color filter layer is formed on the flat base layer. In the method described in Japanese Laid-Open Patent Publication No. 8-248409, a spin coating method is used to form the light shielding portions.

However, there is a problem that the upper surface of the color filter layer cannot be sufficiently flattened by either of the methods described in the above-described patent documents.

In the case of the method described in Japanese Laid-Open Patent Publication No. 7-120613, the light shielding film is exposed by using a photomask and, therefore, misalignment can occur in the pattern of the light shielding portions depending on the accuracy of the exposure apparatus, resulting in failure to form the light shielding portions in the desired configuration. In such a case, a gap maybe formed between the color filters and the light shielding portions in some location in the light shielding layer or a light shielding portion having a width exceeding the alignment margin may be formed on a color filter end portion, resulting in the formation of a projection or a recess in the upper surface of the color filter layer even after the second development step.

In the case of the method described in Japanese Laid-Open Patent Publication No. 8-248409, the color filter layer is formed on the flat base layer but a gap may be formed between the color filters to form a recess or the color filters may overlap one another to form a projection if misalignment occurs in patterning of the color filters.

SUMMARY OF THE INVENTION

In order to overcome the above-described problems, preferred embodiments of the present invention to provide a color filter substrate that is capable of flattening the upper surface of the color filter layer, a method of manufacturing the color filter substrate and a display device including the color filter substrate.

According to a preferred embodiment of the present invention, a color filter substrate including a transparent substrate, a color filter layer provided on the transparent substrate and having a plurality of color filters arranged so that gaps are formed between the color filters, a light-transmitting resin layer having a plurality of light-transmitting resin portions respectively disposed directly on the substrate and only in the gaps between the color filters, and a light shielding layer having a plurality of light shielding portions disposed on the plurality of light-transmitting resin portions in the gaps between the plurality of color filters.

In this preferred embodiment, upper surfaces of the plurality of light shielding portions and the plurality of color filters form a substantially flat surface.

In another preferred embodiment of the present invention, a color filter substrate includes a transparent substrate, a color filter layer provided on the transparent substrate and having a plurality of color filters arranged such that gaps exist between the color filters, a light-transmitting resin layer having a plurality of light-transmitting resin portions respectively disposed only in the gaps between the plurality of color filters, and a light shielding layer having a plurality of light shielding portions respectively disposed on the light-transmitting resin portions in the gaps between the plurality of color filters, wherein upper surfaces of the plurality of light shielding portions and the plurality of color filters define a substantially flat surface.

The color filter substrate according to various preferred embodiments of the present invention may further include a display region and a picture-frame region surrounding the display region. The light shielding layer further may have another light shielding portion that is larger in thickness than the plurality of light shielding portions disposed in the gaps between the color filters.

The plurality of light shielding portions disposed in the gaps between the color filters, the plurality of color filters and the plurality of light-transmitting resin portions may be disposed in the display region, and the second light shielding portion may be disposed in the picture-frame region.

Preferably, the film thickness of the another light shielding portion is approximately equal to the film thickness of the color filter layer.

The plurality of color filters may include a first color filter and a second color filter differing in color from each other.

The plurality of color filters may further include a third color filter differing in color from each of the first color filter and the second color filter.

Each of the first color filter, the second color filter and the third color filter may be one of a red color filter, a green color filter and a blue color filter.

The shape of each of the plurality of color filters as viewed in section may be a normal tapered shape or an inverse tapered shape.

The shape of each of the plurality of color filters as viewed in section may be a substantially rectangular shape.

A thickness of the plurality of light-transmitting resin portions may preferably be about half of a thickness of the color filter layer.

A thickness of the plurality of light shielding portions located in the gaps between the plurality of color filters may preferably be about half of a thickness of the color filter layer.

A thickness of the plurality of light-transmitting resin portions may preferably be substantially equal to a thickness of the plurality of light shielding portions located in the gaps between the plurality of color filters.

The light-transmitting resin layer may be formed of one of an acrylic resin, an epoxy resin, and a polyurethane resin.

According to another preferred embodiment of the present invention, a display device includes a color filter substrate according to one of the various preferred embodiments of the present invention described above.

According to yet another preferred embodiment of the present invention, a method of manufacturing a color filter substrate includes a step of forming a color filter layer having a plurality of color filters disposed on a transparent substrate so that gaps are formed between the color filters, a step of forming a light-transmitting resin layer having a plurality of light-transmitting resin portions respectively disposed directly on the substrate and only in the gaps between the color filters, and a step of forming a black resin layer having a plurality of first black resin portions respectively disposed on the plurality of light-transmitting resin photosensitive portions in the gaps between the color filters.

Preferably, the upper surfaces of the plurality of first black resin portions and the plurality of color filters form a substantially flat surface.

The step of forming the light-transmitting resin layer preferably includes a step of forming the light-transmitting photosensitive resin film so as to cover the color filter layer, and a step of performing patterning by using the plurality of color filters as a mask, by exposing the light-transmitting photosensitive resin film to ultraviolet light passing through the transparent substrate from the back surface side of the transparent substrate, and by thereafter performing development.

In addition, the step of forming the black resin layer preferably includes a step of forming the black photosensitive resin film so as to cover the color filter layer and the light-transmitting resin layer, and a step of performing patterning by using the plurality of color filters as a mask, by exposing the black photosensitive resin film to light passing through the transparent substrate and the plurality of light-transmitting resin portions from the back surface side of the transparent substrate, and by thereafter performing development.

Preferably, the step of forming the black resin layer includes a step of performing post baking after the development step, and thermal droop of the plurality of first black resin portions is caused in the post baking step to align the plurality of first black resin portions and the plurality of color filters with each other.

Preferably, the step of forming the color filter layer includes a step of forming a color photosensitive resin film on the transparent substrate, a step of performing patterning by exposing the color photosensitive resin film through a mask and by thereafter performing development, a step of performing exposure on the entire surface of the patterned color photosensitive resin film, and a step of performing post baking after the entire surface exposure step.

The color filter substrate may have a display region and a picture-frame region surrounding the display region. The step of forming the color filter layer may include a step of forming the plurality of color filters in the display region. The step of forming the light-transmitting resin layer may include a step of forming the plurality of light-transmitting resin portions in the display region. The step of forming the black resin layer may include a step of forming the black photosensitive resin film covering the plurality of color filters and the plurality of light-transmitting resin portions formed in the display region and extending over the picture-frame region of the transparent substrate, a first exposure step of exposing at least the black photosensitive resin film in the display region to light passing through the transparent substrate from the back surface side of the transparent substrate by using the color filter layer as a mask, a second exposure step of selectively exposing at least a portion of the black photosensitive resin film in the picture-frame region from the upper surface side of the transparent substrate, and a step of forming, after the first and second exposure steps, the plurality of first black resin portions in the display region by performing development on the black photosensitive resin film, and forming a second black resin portion thicker than the plurality of first black resin portions on the picture-frame region.

The thickness of the black photosensitive resin film may preferably be set to a value that is equal to or less than the thickness of the color filter layer. The first exposure step may include a step of selectively setting a lower layer portion of a predetermined thickness in the black photosensitive resin film in the display region. The second exposure step may include a step of setting the black photosensitive resin film in the picture-frame region.

The first exposure step may include a step of exposing the black photosensitive resin film in the picture-frame region and in the display region.

The thickness of the black photosensitive resin film may preferably be set to a value equal to or less than the thickness of the color filter layer. The first exposure step may include a step of selectively setting a lower layer portion of a predetermined thickness in the black photosensitive resin film. The second exposure step may include a step of setting an upper layer portion of at least a portion of the black photosensitive resin film in the picture-frame region positioned above the lower layer.

The thickness of the light-transmitting resin portions may preferably be set so that the sum of the thickness of the light-transmitting resin portions and the predetermined thickness of the lower layer portion of the black photosensitive resin film is approximately equal to the thickness of the color filter layer. The step of forming the black resin layer may include a step of forming the plurality of first black resin portions and forming in the picture-frame region a second black resin portion having a thickness larger than the thickness of the plurality of first black resin portions and equal to or less than the thickness of the color filter layer.

The color filter layer, the black resin layer and the light-transmitting resin layer may be formed by a spin coating method, a dry film method or a slit coating method.

The black resin layer may be formed by a dry film method.

According to yet another preferred embodiment of the present invention, a method of manufacturing a color filter substrate includes a step of forming a color filter layer having a plurality of color filters disposed on a transparent substrate so that gaps are formed between the color filters, a step of forming a photosensitive resin film over the color filter layer, a step of exposing the photosensitive resin to light passing through the transparent substrate from the back surface side of the transparent substrate by using the color filter layer as a mask, and a step of forming a light-transmitting resin layer including a plurality of light-transmitting resin portions, each of which is selectively disposed in the gaps between the color filters, by developing the photosensitive resin exposed to light.

Other features, elements, steps, characteristics and advantages of the present invention will become more apparent from the following detailed description of preferred embodiments thereof with reference to the attached drawings.

BRIEF DESCRIPTION OF THE DRAWINGS

FIG. 8 is a cross-sectional view of an ordinary active-matrix liquid crystal display device.

DETAILED DESCRIPTION OF THE PREFERRED EMBODIMENTS

A color filter substrate of the present invention and a method of manufacturing the color filter substrate will be described with reference to the accompanying drawings. An example of a color filter substrate used in an active-matrix liquid crystal display will be described as a preferred embodiment of the present invention, as is that in the description of the conventional art. However, the present invention is not limited to preferred embodiments described below. The present invention can also be applied to other various displays including other types of liquid crystal displays, electroluminescent (EL) displays and plasma displays.

Figure 1A:
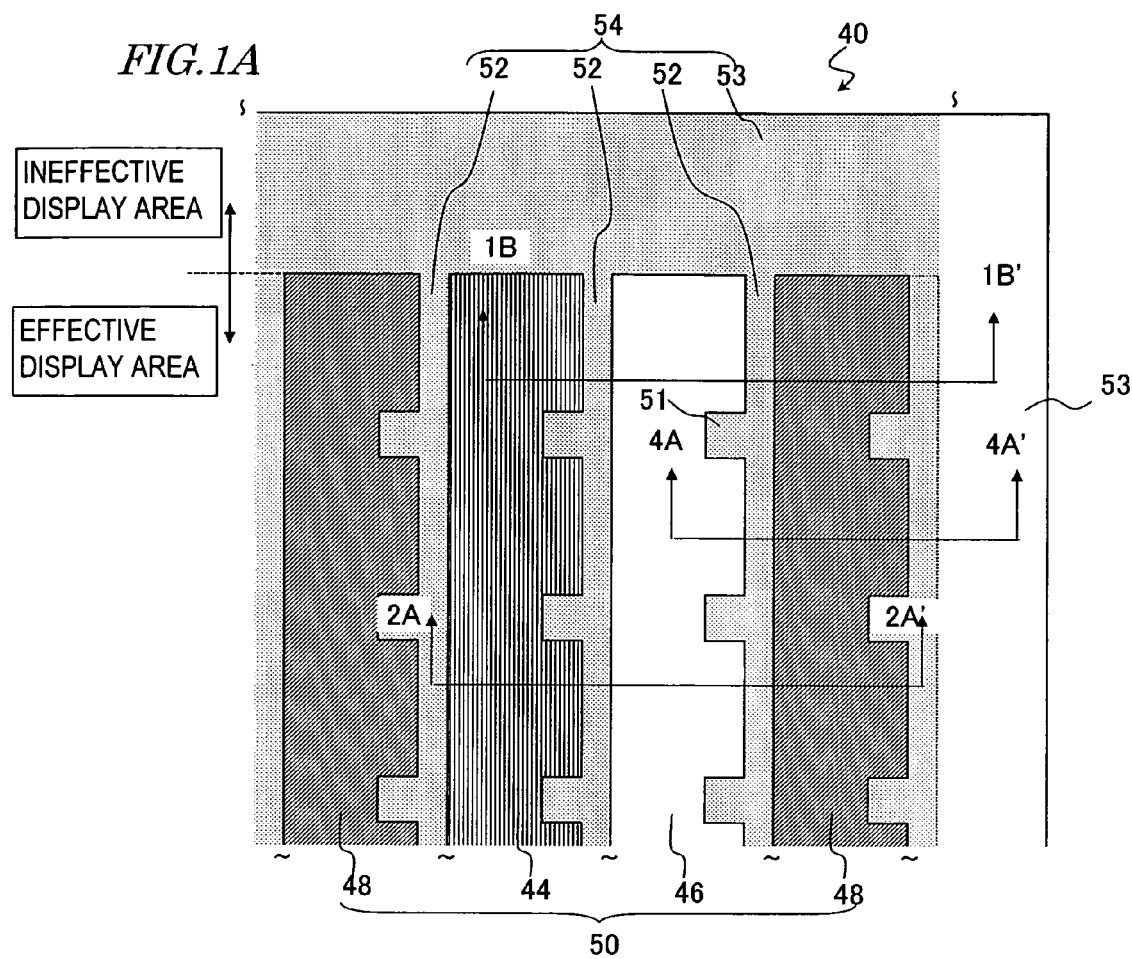
FIG. 1A is a plan view of a color filter substrate according to a preferred embodiment of the present invention.
Figure 1B:
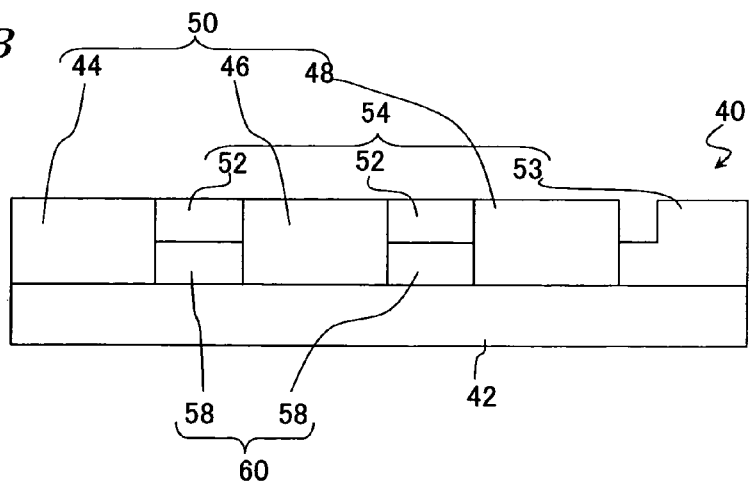
FIG. 1B is cross-sectional view along the line 1B-1B' in FIG. 1A.

FIGS. 1A and 1B are diagrams showing a color filter substrate 40 which represents a preferred embodiment of the present invention. FIG. 1A is a plan view of the color filter substrate 40, and FIG. 1B is a cross-sectional view along line 1B-1B' in FIG. 1A. The structure of the color filter substrate 40 as viewed in section is basically the same as the color filter substrate 30 shown in FIG. 8 except for a the important differences described below.

The color filter substrate 40 of the present preferred embodiment of the present invention includes a transparent substrate 42, a color filter layer 50, a light-transmitting resin layer 60 and a light shielding layer 54. The color filter layer 50, the light-transmitting resin layer 60 and the light shielding layer 54 are provided on the transparent substrate 42.

The color filter layer 50 has color filters (e.g., a first color filter 44, a second color filter 46 and a third color filter 48) provided on the transparent substrate 42 in a state of being spaced apart from each other. Typically, the color filter layer includes color filters of three different colors (red, blue and green). The color filter 44, 46, or 48 is preferably one of a red color filter, a blue color filter and a green color filter. In an example of the color filters 44, 46, and 48 of this preferred embodiment shown in FIG. 1A, the color filters 44, 46, and 48 each preferably have a shape so as to extend in the form of a stripe and are arrayed in correspondence with columns of pixels in a display region. The shapes, placement and colors of the color filters included in the color filter layer 50 and the number of colors included in the color filter layers 50 are not limited to those described above and can be modified as desired.

The light shielding layer 54 has first light shielding portions 52 disposed in gaps between the color filters 44, 46, and 48. In an example of the light shielding layer 54 of this preferred embodiment shown in FIG. 1A, the first light shielding portions 52 are provided in the display region (effective display area) and have a shape that extends in a direction that is substantially parallel to the direction in which the color filters 44, 46, and 48 extend. In this preferred embodiment, the first light shielding portions 52 preferably have projections 51 for light shielding at TFTs provided on the active-matrix substrate. Correspondingly, the first, second and third color filters 44, 46, and 48 respectively have recesses. The shape, arrangement, etc., of the first light shielding portions 52 included in the light shielding layer are not limited to those described above and may be modified as desired.

The light-transmitting resin layer 60 includes light-transmitting resin portions 58 disposed on the substrate side of the first shielding portions 52. That is, the light-transmitting resin portions 58 are disposed directly on the substrate 42 in the gaps between the color filters 44, 46, 48.

A unique feature of the color filter substrate 40 of this preferred embodiment of the present invention resides in that the light-transmitting resin portions 58 are disposed on the substrate side of the first light shielding portions 52 and the upper surfaces of the first light shielding portions 52 and the color filters 44, 46, and 48 form a substantially flat surface.

In a case where a liquid crystal display device is formed by using the above-described color filter substrate 40, a liquid crystal layer is disposed on the upper surface side of the first light shielding portion 52 the color filters 44, 46, and 48. If a difference in level exists in the top surface of the substrate on the liquid crystal layer side, the alignment of liquid crystal molecules is disturbed by the difference in level to cause degradation in display quality. In this color filter substrate 40 of the present preferred embodiment, however, the first light shielding portions 52 and the color filters 44, 46, and 48 form a substantially flat surface on its upper surface and a liquid crystal layer is disposed on this flat surface. Therefore, disturbances do not occur easily in the orientation of liquid crystal molecules contained in the liquid crystal layer and the display quality of the liquid crystal display device is greatly improved.

In a case where a counter electrode is provided on the upper surface side of the first light shielding portions 52 and the color filters 44, 46, and 48, the counter electrode can be formed on the substantially flat surface having substantially no difference in level, thereby reducing the possibility of occurrence of disconnection in the counter electrode.

The display region (effective display area) referred to above is a region in the surface of the color filter substrate 40 in which pixels, i.e., unit display portions, are arranged in matrix form, and which includes the first light shielding portion 52 disposed between each adjacent pair of the pixels (color filters). The color filter substrate 40 has a picture-frame region (non-display area) surrounding the display region. The picture-frame region is, for example, a region which is arranged in the vicinity of edges of the substrate, and which does not contribute to display as shown in FIG. 1A.

In the color filter substrate 40 of this preferred embodiment, the light shielding layer 54 may further include second light shielding portions 53 that are larger in thickness than the first light shielding portions 52, and the second light shielding portions 53 may be disposed in the picture-frame region. The picture-frame region ordinarily needs a light shielding effect that is higher than that between the pixels in the display region. Therefore, it is desirable that the picture-frame region be shielded with the second light shielding portions 53 that are thicker than the first light shielding portions 52.

It is desirable that the thickness of the second light shielding portions 53 be substantially equal to that of the color filter layer 50 as shown in FIG. 1B. However, if the thickness of the second light shielding portions 53 is larger than that of the color filter layer 50, the uniformity of the cell thickness (gap) in the display region is reduced and the cell thickness deviates from the design value. Therefore, it is preferable to set the thickness of the second light shielding portions 53 to a value that is equal to or less than the thickness of the color filter layer 50 by considering a process margin. The recess formed in the upper surface of the second light shielding portions 53 as shown in FIG. 1B is formed in the process of making the light shielding layer because of a need for an alignment margin as described below, and is designed so as to be minimized in size.

An example of a method of manufacturing the color filter substrate 40 will now be described with reference to FIGS. 2 and 3. FIGS. 2A to 2D and FIGS. 3A to 3D are cross-sectional views along line 2A-2A' in FIG. 1. In the following description, a case where the light shielding layer 54 and the entire color filter layer 50 are formed by using dry films will be mainly described by way of example. Also, a case where the first color filter 44 is a red color filter, the second color filter 46 is a green color filter, and the third color filter 48 is a blue color filter will be described by way of example. Each dry film is formed in such a manner that a photosensitive resin film is interposed between film supporting members such as polyethylene terephthalate (PET) films facing its two major surfaces. Four dry films in which red, blue, green and black pigments are respectively dispersed in photosensitive resin films and another dry film including a light-transmitting photosensitive resin film are preferably used in this preferred embodiment. Typically, the photosensitive resin film is of a negative type (photocuring type).

In the following preferred embodiments, a transparent photosensitive resin (i.e., a photosensitive resin which transmits visible light) is preferably used as a light-transmitting photosensitive resin. However, it is not necessary for the light-transmitting photosensitive resin to transmit visible light. It should be noted, in the description of the present invention, the phrase "light-transmitting photosensitive resin" means a photosensitive resin which transmits light to the extent that a black resin portion formed on a film of the light-transmitting photosensitive resin can be exposed by the light transmitted through the film of the light-transmitting photosensitive resin (i.e., light-transmitting photosensitive resin film).

In other words, so long as the light-transmitting photosensitive resin film sufficiently transmits the light that can expose the black resin layer (typically, ultraviolet light of g line, h line and i line), it is not necessary to transmit visible light. However, it is preferable to use a photosensitive resin film which does not include a pigment or dye and is colorless and transparent. This is because a pigment or dye which absorbs visible light also absorbs ultraviolet light, generally.

Figure 2A:
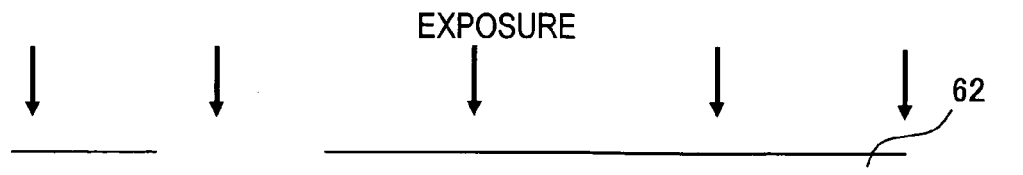
FIGS. 2A to 2D are diagrams for explaining an example of a method of manufacturing the color filter substrate according to a preferred embodiment of the present invention.
Figure 2B:
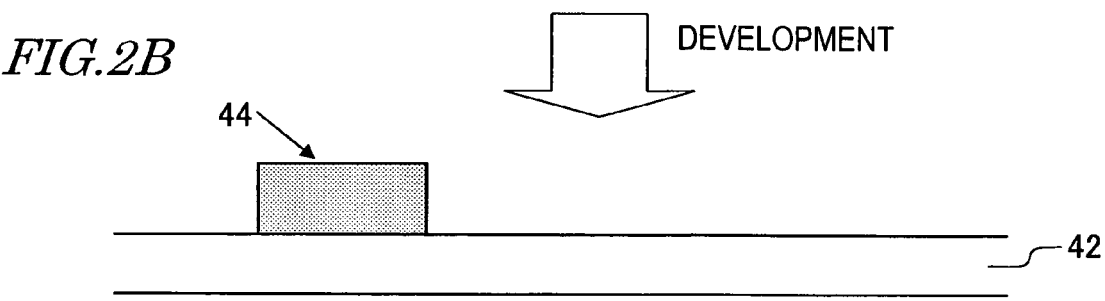

First, the dry film for the red color filter 44 is adhered to the transparent substrate 42 by being pressed against the same with a roller, and the film supporting member is separated, thereby transferring a red photosensitive resin film 44R onto the substrate 42 as shown in FIG. 2A. Ordinarily, this step is a thermal transfer step executed by heating the dry film. Subsequently, the red photosensitive resin film 44R is exposed with a mask 62 disposed thereon and undergoes development, as shown in FIG. 2B. The red color filter 44 is thereby formed.

Figure 2C:
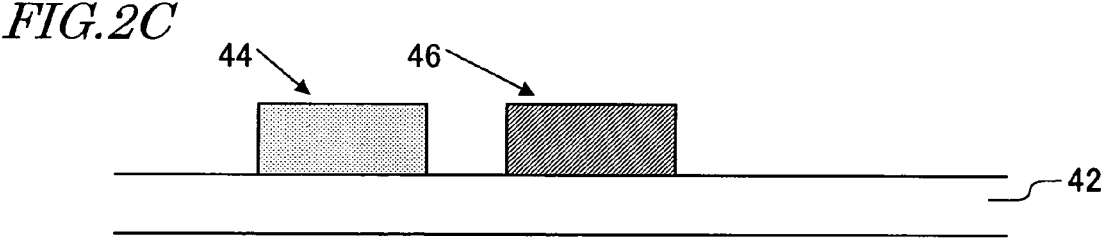
Figure 2D:
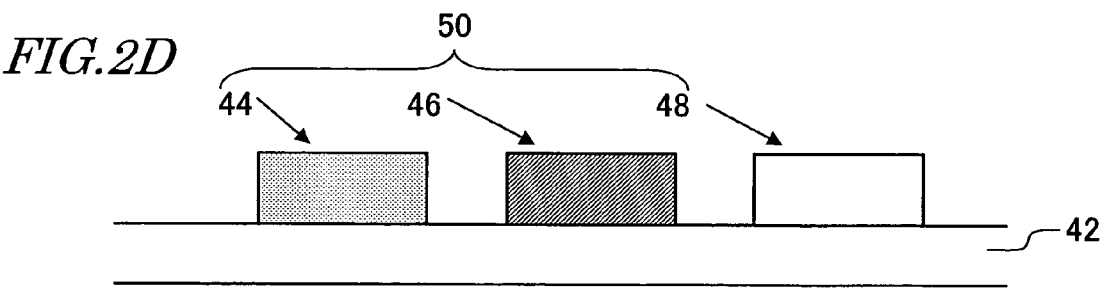

The same step as that described above is performed to form the blue color filter 46, as shown in FIG. 2C. Thereafter, the green color filter 48 is formed, as shown in FIG. 2D.

It is preferred that each time one of these color filters is formed, entire surface exposure (post exposure) be performed and, further, post baking be performed at about 200° C., for example. Post baking may be performed and the filters may be set almost completely (thermo-set) to prevent, for example, changes in the shapes of the color filters, scratches on the color filters and attachment of dust to the color filters (stabilize the color filters). Post exposure is performed before post baking for the purpose of setting the color filters to such an extent that the color filters are not thermally deformed during post baking. Post exposure is performed, for example, as exposure both from the upper surface side and the back surface side of the substrate 42.

Exposure may be performed only from the upper surface side or the back surface side of the substrate 42. However, it is preferable to perform exposure both from the upper surface side and from the back surface side in order to further stabilize the shapes of the color filters. In this specification, "setting" of the photosensitive resin material widely denotes a phenomenon which is accompanied by polymerization reaction and in which the photosensitive resin material is made insoluble in the developer.

Table 1 shows the thickness and the chromaticity of each of the red, green and blue color filters. As shown in Table 1, the film thicknesses of the red, green and blue color filters are determined so as to be equal to each other. The film thickness of each of the three color filters is determined as the maximum of the necessary thickness for enabling the three color filters to obtain a sufficiently high degree of chromaticity.

TABLE 1

| Color filter | Film thickness (μm) | Chromaticity (x, y, Y) |
| --- | --- | --- |
| Red | 2.0 | (0.647, 0.342, 20.4) |
| Green | 2.0 | (0.285, 0.605, 51.3) |
| Blue | 2.0 | (0.147, 0.068, 7.83) |

The parameters shown in Table 1 are only an example and the color filters used in the present invention are not limited to these values.

Thus, the color filter layer 50 having the red, blue and green color filters 44, 46, and 48 spaced apart from each other is formed.

Figure 3A:
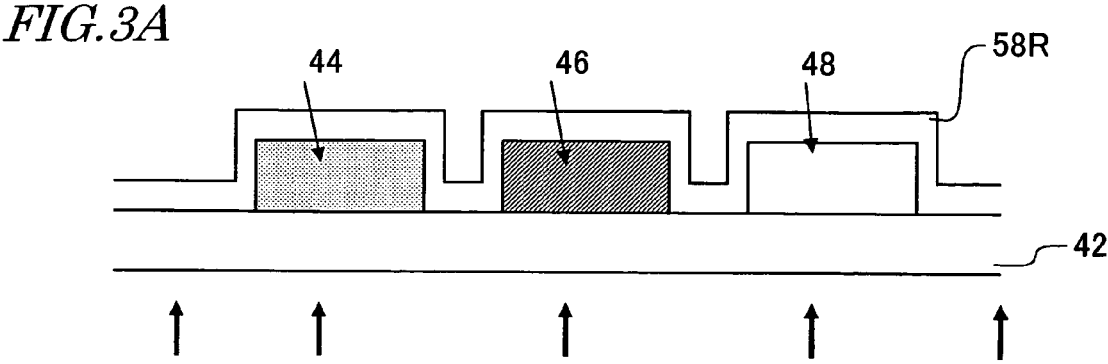
FIGS. 3A to 3D are diagrams for explaining the example of the method of manufacturing the color filter substrate according to a preferred embodiment of the present invention.

Next, a light-transmitting photosensitive resin film 58R is formed so as to cover the color filter layer 50, as shown in FIG. 3A. In this embodiment, a light-transmitting photosensitive resin film 58R formed of an acrylic resin is used.

In addition, the light-transmitting photosensitive resin film 58R is not limited to acrylic resin. For example, a light-transmitting photosensitive resin film 58R formed of an epoxy resin, a polyurethane resin or other suitable material may also be used.

Figure 3B:
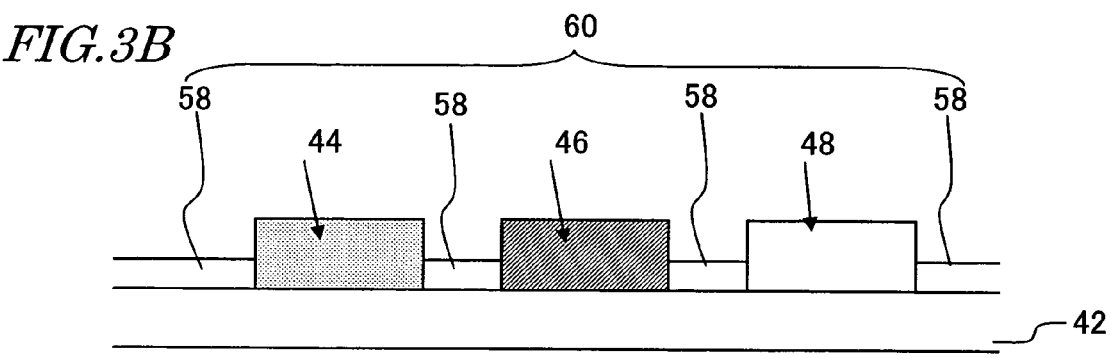

Subsequently, patterning is performed in such a manner that the light-transmitting photosensitive resin film 58R is exposed to light passing through the transparent substrate 42 from the back surface side of the transparent substrate 42 (by back exposure) with the color filters 44, 46, and 48 being used as a mask, and development is performed as shown in FIG. 3B. By using back exposure with the color filters 44, 46, and 48 used as a mask, light-transmitting resin portions 58 are formed in gaps between the color filters in a self-alignment manner (i.e., no use or alignment of separate masks is necessary). Therefore, no gap is formed between the color filters and the light-transmitting resin portion 58.

The film thickness of the light-transmitting resin portions 58 is determined so as to be equal to the difference between the film thickness of the color filters 44, 46, and 48 and the film thickness of the first light shielding portions 52 formed in the subsequent step. In this preferred embodiment, the film thickness of the color filters 44, 46, and 48 is preferably about 2.0 μm and the film thickness of the first light shielding portions 52 is preferably about 1.0 μm, for example. Accordingly, the film thickness of the light-transmitting resin portions 58 is set to about 1.0 μm, for example. Thus, the light-transmitting resin layer 60 including the light-transmitting resin portions 58 (light-transmitting photosensitive resin portions) disposed in the gap between the color filters is formed.

Figure 3C:
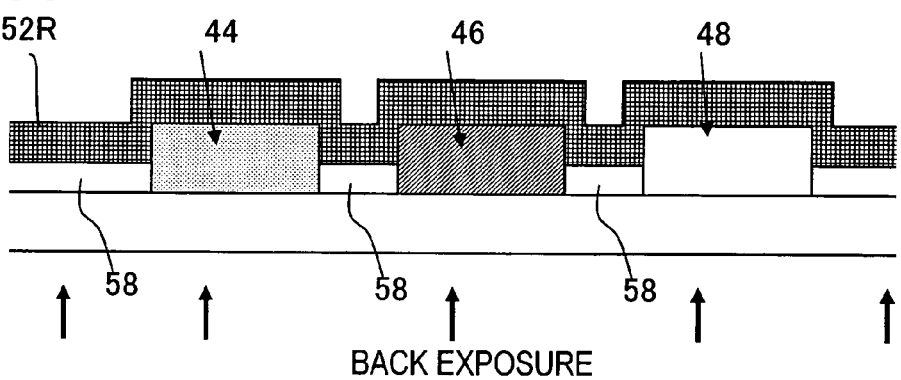
Figure 3D:
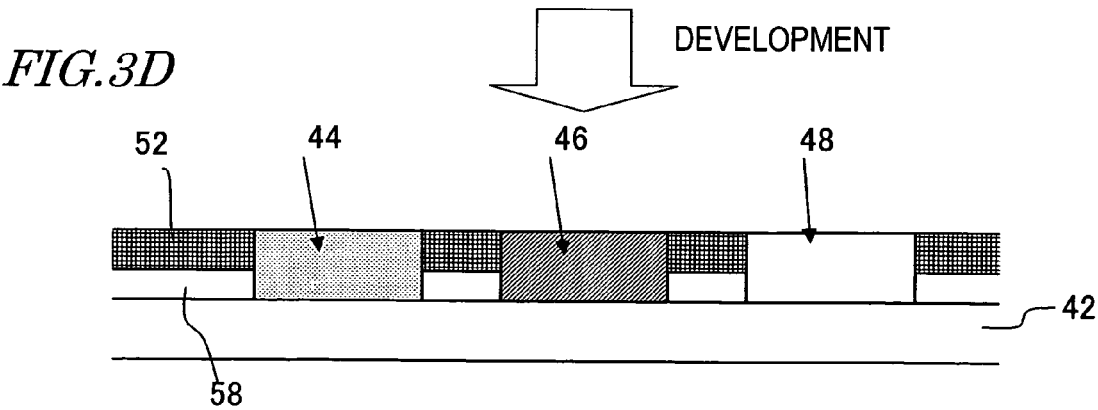

Next, a black photosensitive resin film 52R is formed so as to cover the color filter layer 50 and the light-transmitting resin layer 60 as shown in FIG. 3C. Subsequently, patterning is performed such that the black photosensitive resin film 52R is exposed to UV light passing through the UV-transparent substrate 42 and the light-transmitting resin portion 58 from the back surface side of the transparent substrate 42 (by back exposure) with the color filters 44, 46, and 48 used as a mask, and development is performed as shown in FIG. 3D.

Also in this step, since back exposure with the color filters 44, 46, and 48 used as a mask is used as in the case of the above-described step of forming the light-transmitting resin layer 60, the first light shielding portions 52 are formed on the light-transmitting resin portions 58 in the gaps between the color filters in a self-alignment manner, and no gap is formed between the color filters and the first light shielding portions 52. In this preferred embodiment, the film thickness of the first light shielding portions 52 is preferably set to about 1.0 μm, for example.

Post baking may be performed, for example, at about 200° C. after the formation of the first light shielding portions 52. Thermal deformation (thermal droop) of the first light shielding portions 52 is caused by post baking to align the color filters and the first light shielding portions 52 with each other. That is, the flatness of the surface formed by the upper surfaces of the color filters and the upper surfaces of the first light shielding portions 52 is greatly improved. Also, the first light shielding portions 52 are set substantially completely to be stabilized. From the viewpoint of enabling thermal deformation of the first shielding portions 52 in the post baking step, it is preferred that a post exposure step should not be performed before the post baking step, in contrast to the case of making the color filters.

Figure 6A:
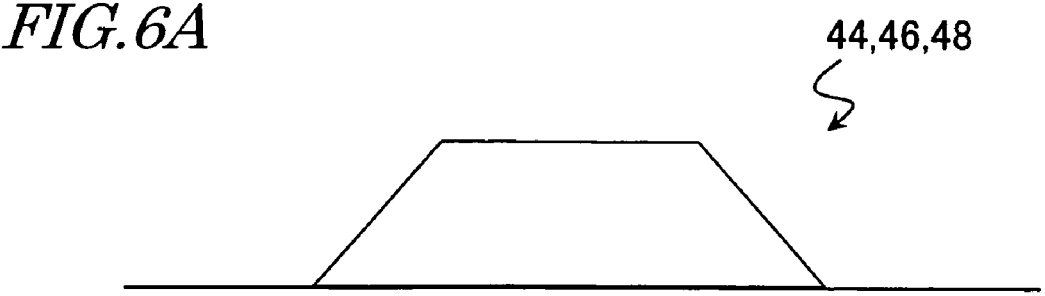
FIGS. 6A and 6B are diagrams showing examples of the shape as viewed in section of the color filters used in the color filter substrate according to a preferred embodiment of the present invention.
Figure 6B:
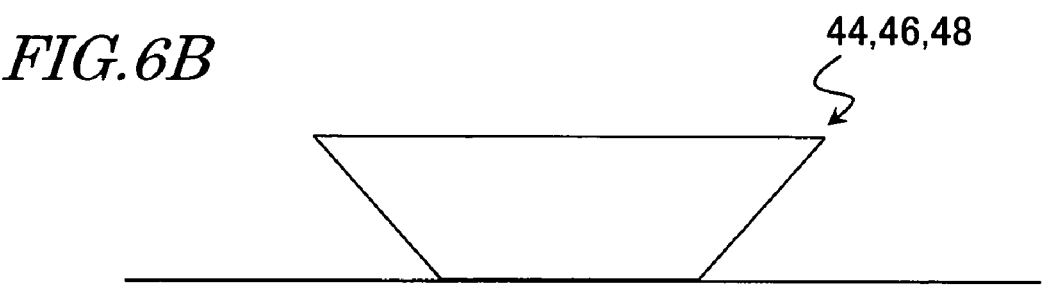

While a case where the shape of the color filters 44, 46, and 48 as viewed in section is substantially rectangular is shown in FIGS. 2 and 3 by way of example, the shape of the color filters 44, 46, and 48 as viewed in section is not limited to the substantially rectangular shape. For example, the color filters 44, 46, and 48 may have a normal tapered shape such as shown in FIG. 6A or an inverse tapered shape such as shown in FIG. 6B. The shape of the color filters as viewed in section is selected to reduce the difference in step between the color filters and the light shielding portions by considering thermal deformation of the first light shielding portions 52 caused by the above-described post baking, etc.

Thus, the light shielding layer 54 including the first shielding portions 52 disposed on the light-transmitting resin portions 58 in the gaps between the color filters is formed.

Thereafter, for example, a counter electrode (formed of indium-tin oxide (ITO), for example) is formed by a well-known method on the color filter layer 50 and the light shielding layer 54, thus making the color filter substrate 40.

The above-described manufacturing method is used to manufacture the color filter substrate having the color filters 44, 46, and 48, the light-transmitting resin portions 58 and the first light shielding portions 52 disposed in the display region of the color filter substrate.

The first light shielding portions 52 may be formed in the display region and in the picture-frame region of the color filter substrate by using the above-described manufacturing method. However, since the picture-frame region of the color filter substrate needs a light shielding effect higher than that between the pixels in the display region, the film thickness of the light shielding portions formed in the picture-frame region is greater than that of the first light shielding portions 52 in the display region to effectively shield the picture-frame region.

Figure 4A:
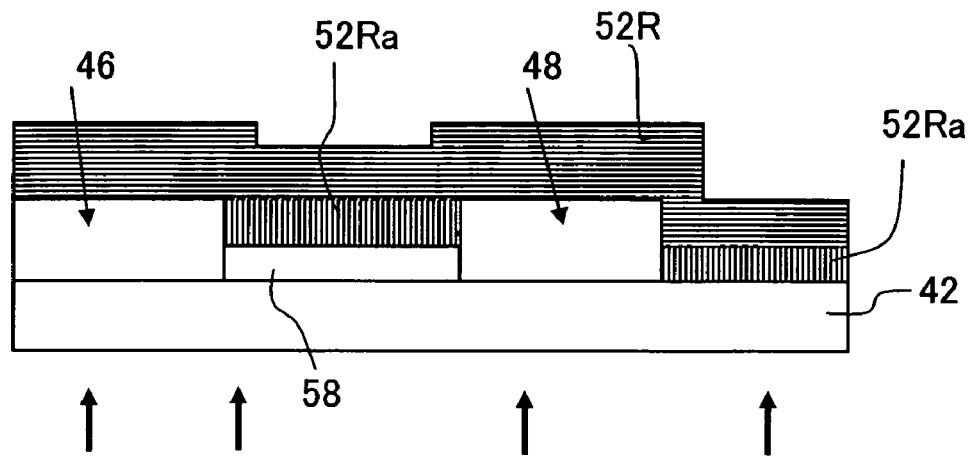
FIGS. 4A, 4B, and 4C are diagrams for explaining the example of the method of manufacturing the color filter substrate according to a preferred embodiment of the present invention.
Figure 4B:
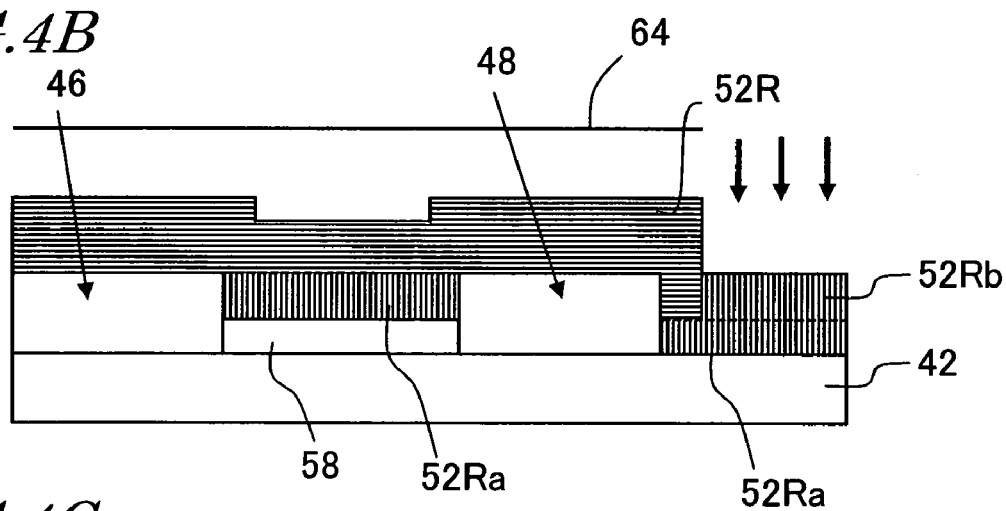
Figure 4C:
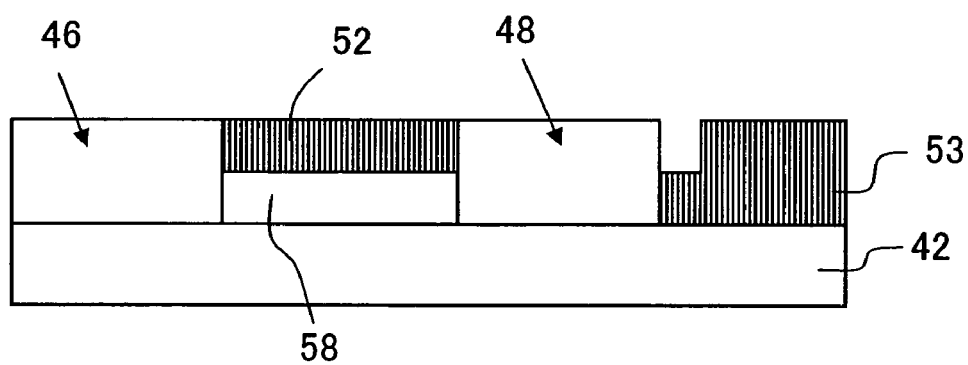

A method of forming the first light shielding portions 52 in the display region by using the black photosensitive resin film 52R for formation of the first light shielding portions 52 in the display region and forming the second light shielding portions 53 larger in film thickness than the first light shielding portions in the picture-frame regions will be described. FIGS. 4A to 4C are cross-sectional views along line 4A-4A' in FIG. 1.

After the color filters 44, 46, and 48 and the light-transmitting resin portions 58 have been formed in the display region of the color filter substrate as shown in FIGS. 2A to 2D and FIGS. 3A and 3B, the black photosensitive resin film 52R is formed. The color filters having the thickness and chromaticity shown in Table 1 are preferably used. The black photosensitive resin film 52R is formed so as to cover the color filters 44, 46, and 48 and the light-transmitting resin portions 58 formed in the display region and extend over the picture-frame region of the transparent substrate 42. The black photosensitive resin film 52R used preferably has, for example, the same thickness (about 2 μm) as that of the color filter layer. Description will be made below of the selection of the film thickness of the black photosensitive resin film 52R.

After the formation of the black photosensitive resin film 52R, the black photosensitive resin film 52R in the display region and the picture-frame region is exposed to UV-light passing through the transparent substrate 42 from the back surface side of the transparent substrate 42 with the color filter layer 54 used as a mask (first exposure step). At this time, only a lower layer portion of a predetermined thickness in the region of the black photosensitive resin film 52R corresponding to the exposed region is selectively set. Referring to FIG. 4A, a lower layer portion 52Ra of the black photosensitive resin film 52R represents the set portion. In this preferred embodiment, the lower surface portion having a thickness (about 1.0 μm) corresponding to one half of the entire film thickness of the black photosensitive resin film 52R is set.

Next, a predetermined region of the black photosensitive resin film 52R in the picture-frame region is selectively exposed to light from the upper surface side of the transparent substrate 42 by using a mask 64 for example, as shown in FIG. 4B (second exposure step). By this second exposure step, an upper surface portion 52Rb which is in an almost unset state in the back exposure step shown in FIG. 4A is set. The predetermined portion of the black photosensitive resin film 52R in the picture-frame region is thereby set throughout the entire thickness. The almost unset state includes various states from a state of being set to such a degree that the resin can be removed substantially completely by development to a completely unset state. In this preferred embodiment, the black photosensitive resin film 52R is set through its entire thickness of approximately 2.0 μm. In the above-described second exposure step, it is ideal to make the boundary between the picture-frame region and the display region and the end of the mask 64 coincide with each other. However, since an alignment margin is required, the end of the mask 64 is disposed on the display region side or on the picture-frame region side of the boundary between the picture-frame region and the display region. However, it is preferred that the end of the mask 64 be disposed on the picture-frame region side of the boundary, as shown in FIG. 4B. If the end of the mask 64 is placed by being shifted to the display region side from the boundary, a projection formed of a portion of the black photosensitive resin film 52R is finally formed on the color filter and a difference in level results. Therefore, this placement is not preferable.

After the second exposure step shown in FIGS. 4A and 4B, the black photosensitive resin film 52R undergoes development. While the portion of the black photosensitive resin film 52R existing in the predetermined region in the picture-frame region, i.e., the portion exposed in the second exposure step, is set throughout the entire thickness, the upper layer portion in the other portion of the black photosensitive resin film 52R is in the almost unset state. Consequently, when the portion of the black photosensitive resin film 52R in the almost unset state is removed by development, the first light shielding portions 52 are formed in the display region and the second light shielding portions 53 thicker than the first light shielding portions 52 are formed in the picture-frame region, as shown in FIG. 4C.

In the description of this preferred embodiment, a case where the black photosensitive resin film 52R having substantially the same film thickness as the color filter layer 50 is used has been described by way of example. Also, the black photosensitive resin film 52R used is set through a thickness of about 1.0 μm from the exposed surface (half of the film thickness of the black photosensitive resin film 52R) in the case of exposure from one side of the black photosensitive resin film 52R. This black photosensitive resin film 52R is used, the predetermined portion of the black photosensitive resin film 52R in the picture-frame region is set throughout the entire film thickness by selective exposure from the opposite sides of the film, and the portion in the display region is set through one half of the entire film thickness by exposure from one side of the film. As a result, the thickness of the second light shielding portions 53 provided in the predetermined region in the picture-frame region is preferably set to about 2 μm while the thickness of the first light shielding portions 52 disposed in the display region is preferably set to about 1 μm, for example. In this preferred embodiment, as described above, the two exposure steps are selectively performed on the predetermined region of the black photosensitive resin film 52R to enable the first light shielding portions 52 and the second light shielding portions 53 larger in film thickness than the first light shielding portions 52 to be formed in the display region and in the picture-frame region, respectively, by using the black photosensitive resin film 52R in common in the sequence of manufacturing steps.

In the above description, a case has been described by way of example in which the black photosensitive resin film 52R in the display region and the picture-frame region is exposed in the first exposure step to selectively set the lower surface portion 52Ra of the black photosensitive resin film 52R (FIG. 4A) and, thereafter, the upper layer portion 52Rb positioned above the lower surface portion 52Ra of at least a portion of the black photosensitive resin film 52R in the picture-frame region is set in the second exposure step to form the second light shielding portions 53 in the picture-frame region. However, the present invention is not limited to this case. The exposure conditions, the film thickness and the kind of the black photosensitive resin film 52R can be changed, if necessary.

Figure 5A:
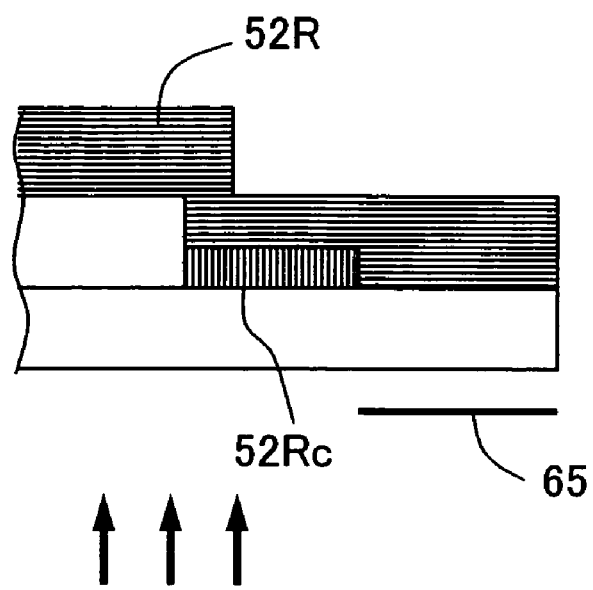
FIGS. 5A, 5B, and 5C are diagrams for explaining another example of the method of manufacturing the color filter substrate according to a preferred embodiment of the present invention.
Figure 5B:
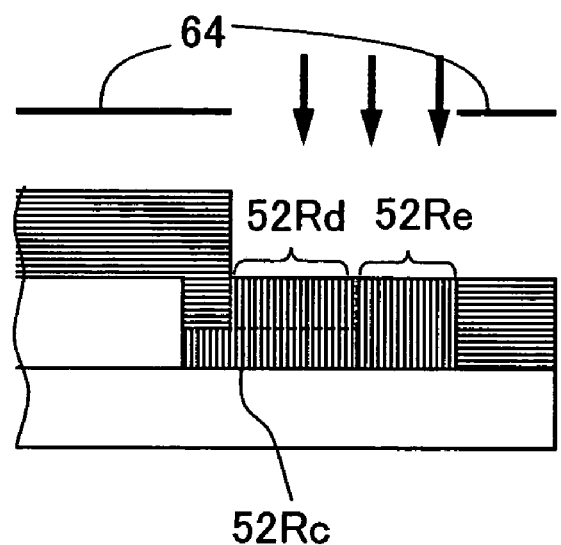
Figure 5C:
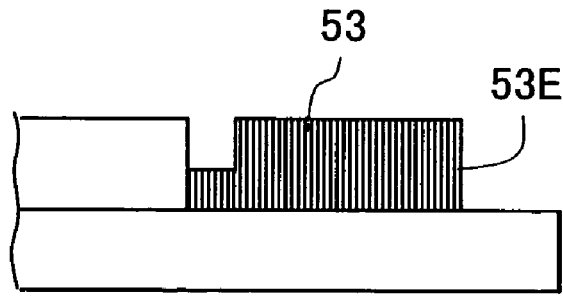

An example of modification of the above-described manufacturing step will be described with reference to FIGS. 5A to 5C. FIGS. 5A to 5C are cross-sectional views in which only the picture-frame region of the color filter substrate and a portion of the display region in the vicinity of the picture-frame region are selectively shown.

For example, as shown in FIG. 5A, the display region may be exposed by back exposure while the picture-frame region is selectively shielded by using a back exposure mask 65 in the first exposure step. By the first exposure step, a lower layer portion 52Rc of a predetermined thickness disposed in the portion corresponding to the exposed region of the black photosensitive resin film 52R in the picture-frame region is selectively set.

Because an alignment margin is required, the end of the mask 65 is placed on the picture-frame region side or the display region side of the boundary between the picture-frame region and the display region. If the width of the color filter in a direction that is substantially perpendicular to the lengthwise direction exceeds the alignment margin in back exposure, the end of the mask 65 may be placed on the display region side of the boundary to provide substantially no back exposure region in the picture-frame region. However, if the end of the mask 65 is placed on the display region side of the boundary so that no gap is formed between the region of the black photosensitive resin film 52R set by exposure (second exposure step) through the mask 64 from the upper surface side of the substrate performed after the first exposure step and the color filter adjacent to the picture-frame region, a projection formed of a portion of the black photosensitive resin film 52R is finally formed on the surface of the color filter provided in the vicinity of the boundary between the display region and the picture-frame region. It is preferable to place the end of the mask 65 on the picture-frame region side of the boundary between the picture-frame region and the display region as shown in FIG. 5A in order to avoid formation of this projection in the display region.

Next, the black photosensitive resin film in the picture-frame region is exposed from the upper surface side of the substrate 42 by using the mask 64, as in the case of the exposure shown in FIG. 4B. In a case where the end of the mask 65 is placed on the picture-frame region side of the boundary between the picture-frame region and the display region in the first exposure step as shown in FIG. 5A, a mask alignment margin is required and an upper layer portion 52Rd existing above the lower layer portion 52Rc of the black photosensitive resin film exposed in the first exposure step is also exposed in the second exposure step, as shown in FIG. 5B.

Consequently, a black photosensitive resin film portion 52Re in the region shielded in the first exposure step and the upper layer portion 52Rd on the lower layer portion 52Rc are set as shown in FIG. 5B. At this time, the black photosensitive resin film portion 52Re in the region shielded in the first exposure step is exposed only in the second exposure step but at least a portion closer to the surface thereof is set to such a degree that it is not removed in the subsequent development step.

Next, the black photosensitive resin film 52R undergoes development, as does that in the above-described case. The unset portion of the black photosensitive resin film 52R is thereby removed. Post baking may be thereafter performed if necessary.

By performing the above-described steps, a color filter substrate is obtained in which the second light shielding portions 53 thicker than the first light shielding portions 52 formed in the display region are formed in the picture-frame region, as shown in FIG. 5C.

As described above with reference to FIGS. 5A-5C, the advantage of controlling the position of the end 53E of the second light shielding portions 53 can be obtained if the back exposure mask 65 is used together with the front exposure mask 64. Consequently, the pattern edge can be accurately formed at the desired position according to a panel manufacturing process and a design if the above-described method is used.

The film thickness of the light-transmitting resin portions 58 disposed as a layer below the first light shielding portions 52 is selected so that the sum of the height of the light-transmitting resin portions 58 and the height of the first light shielding portions 52 is substantially equal to the film thickness of the color filters. The light-transmitting resin portions 58 are provided as a layer below the first light shielding portions 52 to enable the upper surfaces of the first light shielding portions 52 and the upper surfaces of the color filters disposed in the display region to form a flat surface. Also, since the height of the upper surfaces of the second light shielding portions 53 disposed in the picture-frame region is approximately equal to the height of the upper surfaces of the color filters disposed in the display region, it is possible to prevent the formation of a difference in level between the color filter layer and the light shielding layer through the display region and the picture-frame region of the color filter substrate.

Figure 7:
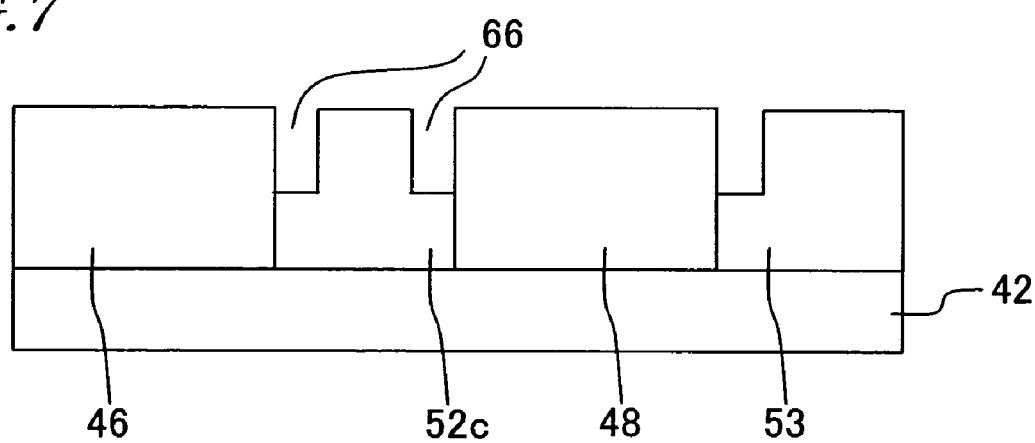
FIG. 7 is a cross-sectional view of a color filter substrate shown as a comparative example.
Figure 9A:
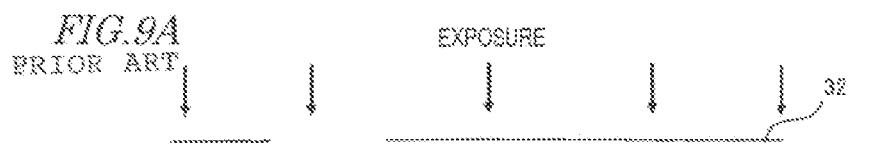
FIGS. 9A to 9F are diagrams for explaining a method of manufacturing a conventional color filter substrate.
Figure 9B:
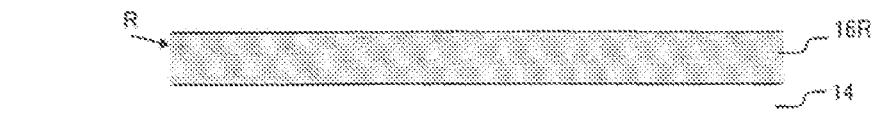
Figure 9C:
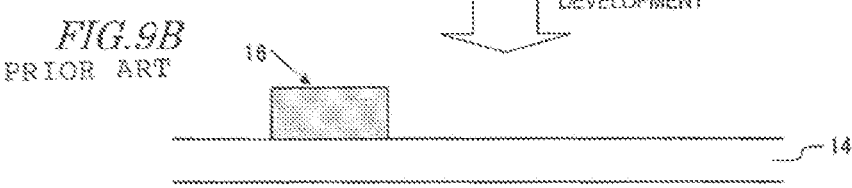
Figure 9D:
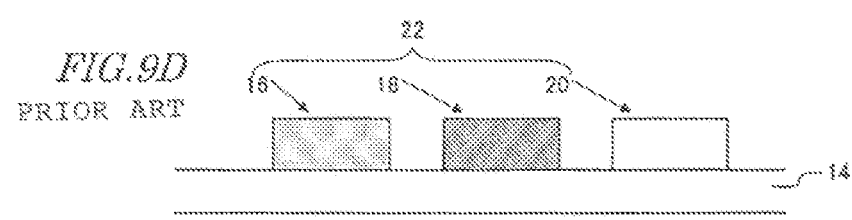
Figure 9E:
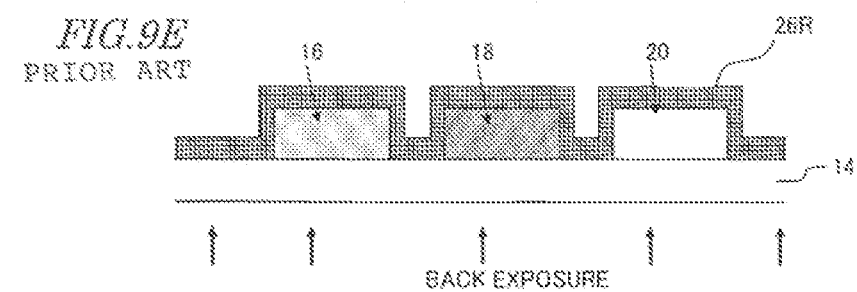
Figure 9F:
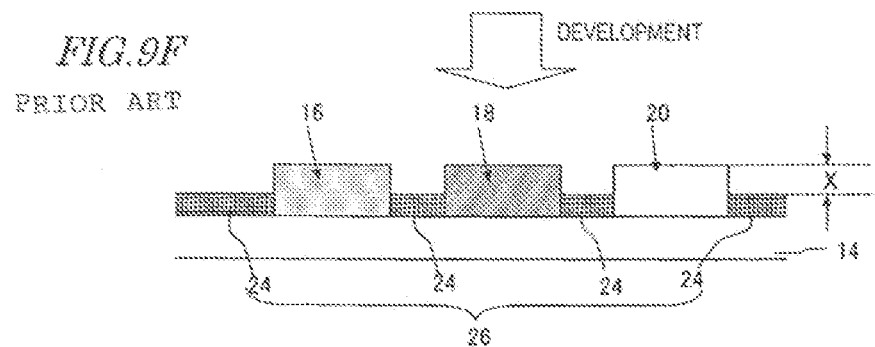

In the case of the conventional color filter substrate manufacturing method (FIG. 9) in which no light-transmitting resin layer is formed between the substrate and the light shielding layer, there is a need to perform exposure from the upper surface side of the substrate (FIG. 7) in order to set the first light shielding portions 52C disposed between the color filters in the display region in a case where the light shielding portions are formed between the color filters in the display region and in the picture-frame region by using the black photosensitive resin film 52R having a film thickness of 2 μm. This exposure is not exposure in a self-alignment manner such as back exposure but exposure must be performed, for example, by using a mask, and an alignment margin is therefore required. As a result, a difference 66 in level is formed between the first light shielding portions 52C and the color filters 44, 46, and 48, as shown in FIG. 7.

In contrast, in the present preferred embodiment of the present invention, light-transmitting resin portions 58 are disposed below the first light shielding portions 52 located between the color filters 44, 46, and 48 in the display region to enable setting of the first light shielding portions 52 by back exposure performed only one time, thus preventing formation of a difference in level between the first light shielding portions 52 and the color filters 44, 46, and 48.

While an example in which the color filter layer, the light shielding layer and the light-transmitting resin layer are formed by using a dry film method has been described above, these layers may be formed by using a spin coating method or a slit coating method. However, the dry film method has the advantage of forming a layer that is more uniform in thickness in particular in comparison with a spin coating method or a slit coating method using a photosensitive material in liquid form and can therefore be used suitably in the present invention. In the present invention, it is preferred that at least the light shielding layer 54 and the light-transmitting resin layer 60 in particular be formed by using the dry film method. The dry film method also has the advantage of improving the yield of materials and reducing the manufacturing cost.

Two or more different methods may be used in combination to form the color filter layer, the light shielding layer and the light-transmitting resin layer (for example, the color filter layer and the light shielding layer are formed by the dry film method, while the light-transmitting resin layer is formed by a spin coating method). However, use of a common method is advantageous in that the manufacturing process can be simplified. Therefore, it is preferable to use the dry film method to form each of the color filter layer, the light shielding layer and the light-transmitting resin layer, as described above with respect to examples of the process.

In a case where a spin coating method is used, a spinner is used to coat a glass substrate with a photosensitive resin in which a pigment of a desired color is dispersed, the photosensitive resin is dried, and a photosensitive resin film thereby obtained undergoes exposure and development, thereby forming a layer having a desired shape.

The present invention provides a color filter substrate that is capable of flattening the upper surface of a color filter layer and a method of manufacturing the color filter substrate. A display device having high display qualities can be obtained by using the color filter substrate of the present invention.

While preferred embodiments of the invention have been described above, it is to be understood that variations and modifications will be apparent to those skilled in the art without departing the scope and spirit of the invention. The scope of the invention, therefore, is to be determined solely by the following claims.

This application is based on Japanese Patent Application No. 2003-131853 filed on May 9, 2003, the entire contents of which are herein incorporated by reference.

What is claimed is:

1. A color filter substrate comprising:
    a transparent substrate;
    a color filter layer provided on said transparent substrate and having a plurality of color filters arranged such that gaps exist between said color filters;
    a light-transmitting resin layer having a plurality of light-transmitting resin portions respectively disposed on said substrate and only in said gaps between said plurality of color filters; and
    a light shielding layer having a plurality of light shielding portions respectively disposed on said light-transmitting resin portions in the gaps between said plurality of color filters; wherein
    the light-transmitting resin layer is formed of a negative type photosensitive resin.

2. The color filter substrate according to claim 1, wherein upper surfaces of said plurality of light shielding portions and said plurality of color filters define a substantially flat surface.

3. The color filter substrate according to claim 1, further comprising a display region and a picture-frame region surrounding said display region, wherein said light shielding layer further includes an additional light shielding portion that is larger in thickness than said plurality of light shielding portions located in the gaps between said plurality of color filters, and said plurality of light shielding portions, said plurality of color filters and said plurality of light-transmitting resin portions are disposed in said display region, and said additional light shielding portion is disposed in said picture-frame region.

4. The color filter substrate according to claim 3, wherein the film thickness of said additional light shielding portion is larger than the film thickness of said plurality of light shielding portions located in the gaps between said plurality of color filters, and is equal to or less than the film thickness of said color filter layer.

5. The color filter substrate according to claim 1, wherein said plurality of color filters include a first color filter and a second color filter differing in color from each other.

6. The color filter substrate according to claim 5, wherein said plurality of color filters further include a third color filter differing in color from each of said first color filter and said second color filter.

7. The color filter substrate according to claim 6, wherein each of said first color filter, said second color filter and said third color filter is one of a red color filter, a green color filter and a blue color filter.

8. The color filter substrate according to claim 1, wherein a shape of each of said plurality of color filters as viewed in section is one of a normal tapered shape and an inverse tapered shape.

9. The color filter substrate according to claim 1, wherein a shape of each of said plurality of color filters as viewed in section is a substantially rectangular shape.

10. The color filter substrate according to claim 1, wherein a thickness of said plurality of light-transmitting resin portions is about half of a thickness of the color filter layer.

11. The color filter substrate according to claim 1, wherein a thickness of said plurality of light shielding portions located in the gaps between said plurality of color filters is about half of a thickness of the color filter layer.

12. The color filter substrate according to claim 1, wherein a thickness of the plurality of light-transmitting resin portions is substantially equal to a thickness of said plurality of light shielding portions located in the gaps between said plurality of color filters.

13. The color filter substrate according to claim 1, wherein the light-transmitting resin layer is formed of one of an acrylic resin, an epoxy resin, and a polyurethane resin.

14. A display device comprising a color filter substrate according to claim 1.

15. A color filter substrate comprising:
    a transparent substrate;
    a color filter layer provided on said transparent substrate and having a plurality of color filters arranged such that gaps exist between said color filters;
    a light-transmitting resin layer having a plurality of light-transmitting resin portions respectively disposed only in said gaps between said plurality of color filters; and
    a light shielding layer having a plurality of light shielding portions respectively disposed on said light-transmitting resin portions in the gaps between said plurality of color filters;
    wherein
    upper surfaces of said plurality of light shielding portions and said plurality of color filters define a substantially flat surface;
    the color filter layer includes a display region and a picture-frame region surrounding said display region;
    said light shielding layer further includes an additional light shielding portion;
    a film thickness of said additional light shielding portion is larger than a total thickness of said plurality of light shielding portions located in the gaps between said plurality of color filters;
    a film thickness of said additional light shielding portion is equal to or less than a film thickness of said color filter layer;
    said plurality of light shielding portions, said plurality of color filters, and said plurality of light-transmitting resin portions are disposed in said display region; and
    said additional light shielding portion is disposed in said picture-frame region.

16. The color filter substrate according to claim 15, wherein said plurality of color filters include a first color filter and a second color filter differing in color from each other.

17. The color filter substrate according to claim 16, wherein said plurality of color filters further include a third color filter differing in color from each of said first color filter and said second color filter.

18. The color filter substrate according to claim 17, wherein each of said first color filter, said second color filter and said third color filter is one of a red color filter, a green color filter and a blue color filter.

19. The color filter substrate according to claim 15, wherein a shape of each of said plurality of color filters as viewed in section is one of a normal tapered shape and an inverse tapered shape.

20. The color filter substrate according to claim 15, wherein a shape of each of said plurality of color filters as viewed in section is a substantially rectangular shape.

21. The color filter substrate according to claim 15, wherein a thickness of said plurality of light-transmitting resin portions is about half of a thickness of the color filter layer.

22. The color filter substrate according to claim 15, wherein a thickness of said plurality of light shielding portions located in the gaps between said plurality of color filters is about half of a thickness of the color filter layer.

23. The color filter substrate according to claim 15, wherein a thickness of the plurality of light-transmitting resin portions is substantially equal to a thickness of said plurality of light shielding portions located in the gaps between said plurality of color filters.

24. The color filter substrate according to claim 15, wherein the light-transmitting resin layer is formed of one of an acrylic resin, an epoxy resin, and a polyurethane resin.

25. A display device comprising a color filter substrate according to claim 15.

26. The color filter substrate according to claim 1, wherein the color filter layer is formed from a dry film.

27. The color filter substrate according to claim 15, wherein the color filter layer is formed from a dry film.

* * * * *